US 7,565,322 B1

(12) United States Patent
Feldman et al.

(10) Patent No.: US 7,565,322 B1
(45) Date of Patent: Jul. 21, 2009

(54) SYSTEMS AND METHODS FOR SERVERLESS SOFTWARE LICENSING

(75) Inventors: David N. Feldman, Cambridge, MA (US); Sreekant Kotay, Richboro, PA (US); Robert E. Rice, Short Hills, NJ (US)

(73) Assignee: Enliven Marketing Technologies Corporation, New York, NY (US)

( * ) Notice: Subject to any disclaimer, the term of this patent is extended or adjusted under 35 U.S.C. 154(b) by 0 days.

(21) Appl. No.: 09/537,086

(22) Filed: Mar. 29, 2000

(51) Int. Cl.
*H04K 1/00* (2006.01)
*H04L 9/00* (2006.01)

(52) U.S. Cl. .............................. 705/50; 705/51; 705/52; 705/53; 705/54; 705/55; 705/56; 705/57; 705/58; 705/59

(58) Field of Classification Search ............... 705/50–59
See application file for complete search history.

(56) References Cited

U.S. PATENT DOCUMENTS 4,937,863 A * 6/1990 Robert et al. ............... 710/200
6,189,146 B1 * 2/2001 Misra et al. ................. 717/177
6,502,079 B1 * 12/2002 Ball et al. ...................... 705/59
6,697,948 B1 * 2/2004 Rabin et al. ................... 726/30
2002/0007454 A1 * 1/2002 Tarpenning et al. ......... 713/156

FOREIGN PATENT DOCUMENTS

WO      WO 00/20950      *   4/2000

* cited by examiner

*Primary Examiner*—Calvin L Hewitt, II
*Assistant Examiner*—Cristina Owen Sherr
(74) *Attorney, Agent, or Firm*—Kenyon & Kenyon LLP

(57) ABSTRACT

A system and method for licensing the use of "plug-in" type software that plays audio, video, and three dimensional content which logs the network address from which content is downloaded and played by the plug-in client software, then sends this information to a billing system maintained by the plug-in software developer. This billing system can then bill the content provider that is associated with the network address based on the number of times the content is played by users of the plug-in software. The system and method can also employ a public key encryption scheme to ensure that the network address information received by the plug-in software is valid and to block the playing of content from content providers that are delinquent in their license payments.

97 Claims, 6 Drawing Sheets

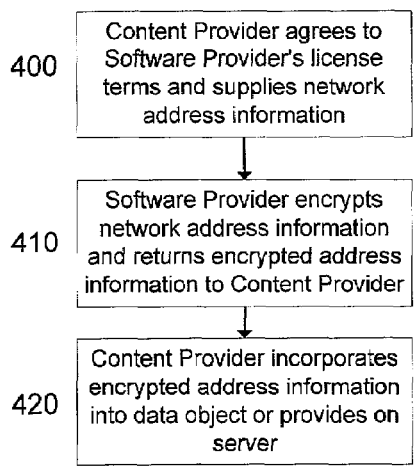
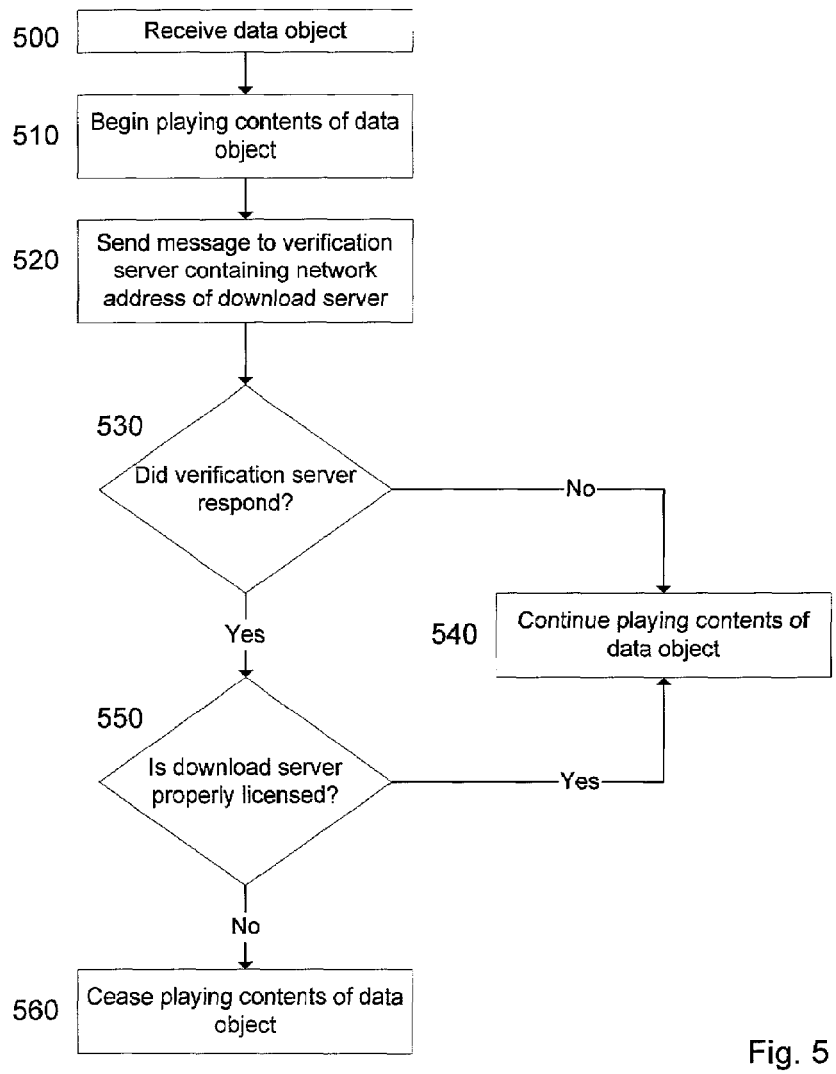
Fig. 4
Fig. 5

SYSTEMS AND METHODS FOR SERVERLESS SOFTWARE LICENSING

FIELD OF THE INVENTION

The present invention is directed to systems and methods for providing software licensing schemes for "plug-in" software that do not require a server at the content provider to enforce license agreements with the software developer.

BACKGROUND OF THE INVENTION

The continued growth and popularity of the Internet and World Wide Web has resulted in an increasing demand from users for more sophisticated content (e.g., audio, video, animation and 3-D) and the ability to interact with this content (e.g., play games and zoom and rotate visual content). The most prevalent method of deploying this kind of content is through the use of "plug-in" client software that is installed on the user's home or office computer. Generally, these plugins are relatively small software applications that are downloaded and installed on a user's computer if the user desires to be able to enjoy the kind of content that the particular plug-in is equipped to play. When installed, a plug-in will usually integrate itself with the operating system and/or web browser such that when the user encounters the kind of content that the plug-in is designed to play, the plug-in launches automatically and plays the content directly within the web browser or within a separate application window.

Currently, many plug-in vendors distribute the plug-in software for free to users and produce revenue by charging content providers for the tools and/or server software needed to produce and distribute the data files or data objects that contain the content. The "charging for the tool" approach involves the software developer selling the software tools that are necessary to create or package the content to content providers. Once created, the content does not require any special server software and may be downloaded or transmitted like any other file. The content providers pay a flat fee for the tools, and can create as much content as they wish using the tools. The plug-in client for reading or playing the created content is then distributed for free by the content providers and/or by the software developer in the form of a network download, a CD ROM, or any other method of software distribution. An example of the "charging for the tool" approach is Adobe Acrobat™ (the tool) and Adobe Acrobat Reader™ (the plug-in client). The "charging for the server software" approach is implemented where the type of content requires that the server run special software in addition to a standard web or file server. Streaming audio or video is an example of the type of content that requires special server software. The software developer charges for the server software that is installed on the content provider's server and the plug-in client software is distributed for free to the individual users. The server software can be implemented with restrictions that may limit the amount of plug-in users who can connect simultaneously or may have a feature for billing the content provider based on how much content is served. An example of the "charging for the server software" approach is RealServer™ by RealNetworks, Inc. Alternative and combination implementations of these two approaches also exist, including charging the user for an enhanced version of the plug-in (e.g., RealPlayerPlus™ by RealNetworks, Inc.), and adding additional features to the tool or server software for an additional charge.

Both of these approaches have significant drawbacks that reduce the possibility that both parties will be fairly compensated for the use of the plug-in. The tools approach is limited in that the software developer collects a flat fee regardless of how much or how little content is created using the tool. Small content providers may not have the financial resources to purchase the tool at all. The server approach is more scalable and allows for price selectivity between large and small content providers, but its usefulness is limited in that it requires administrative control over a web server to arrange for installation of the server software which many small businesses that share servers may not have.

Furthermore, a server approach implementation that bills by the number of total downloads of the content may not account for download requests that are intercepted by proxy/cache servers or the cache component of a web browser. This occurs because some service providers and corporate networks maintain cache/proxy servers that intercept download requests and provide a local copy of the data in order to speed response time and reduce bandwidth demands. Many web browsers also provide a feature that checks to see if a file has been previously downloaded before it requests the download from the server. When a download request is intercepted by the browser or a cache/proxy server, the content provider's server will not register that a "play" has occurred because the server never received the download request.

SUMMARY OF THE INVENTION

The present invention provides a method for implementing a plug-in licensing architecture that does not require the content provider to purchase a tool from the plug-in software developer or install specialized software on the server. The present invention involves logging the network address from which content is downloaded and played by the plug-in client software, and sending this information to a billing system maintained by the plug-in software developer. This billing system can then bill the content provider that is associated with the network address based on the number of times the content is played by users of the plug-in software. Billing based on the number of "plays" of the content rather than the number of downloads also prevents loss of revenue due to web browsers or proxy servers that cache data because the "play" records are created at the plug-in, not the server.

The method and system of the present invention can also employ a public key encryption scheme to ensure that the network address information received by the plug-in software is valid and that the content provider has agreed to be bound by the software developer's license terms.

In one possible implementation of the method of the present invention, to verify the network address information, the plug-in software receives a data object and encrypted network address information from a server, and begins playing the contents of the data object while decrypting the encrypted network address information and then determining whether the decrypted network address information corresponds to a network address of the server. If this correspondence does not exist, the server is not licensed properly and the plug-in ceases to play the contents of the data object.

In one embodiment of the present invention, a "blacklisting" feature is used to block the playing of content from content providers that are delinquent in their license payments or have broken the license agreement in some way. In one implementation of this feature, the plug-in software checks the network address of the server against a list of network addresses belonging to servers that have broken or exceeded the terms of the license agreement. If the server is on this list, the plug-in software will not play any content associated with that server.

An "umbrella" licensing feature may also be provided. According to one implementation of the "umbrella" licensing feature, the plug-in software downloads a list of additional valid network addresses from the server that is located at the encrypted network address that was included with the data object, and allows content from these servers to be played.

BRIEF DESCRIPTION OF THE DRAWINGS

FIG. 4 illustrates one possible embodiment of how the method of the present invention to prevent unlicensed use of the software using encryption could be initiated.

FIG. 5 illustrates one possible embodiment of the method of the present invention to prevent unlicensed use of the software using messages to a license server.

DETAILED DESCRIPTION

The system for software licensing of the present invention may be implemented in a network of electronic information appliances. The network may include, for example, the Internet, a local area network, or a wireless network. Electronic information appliances can include personal computers and network servers such as those made by Dell, Compaq, or Apple, personal digital assistants such as a 3Com Palm V or a unit using the Microsoft Windows CE operating system, mobile telephones that are capable of data access such as those made by Motorola or Qualcomm, set top boxes for televisions such as WebTV, and game consoles equipped for network access such as Sega Dreamcast.

Figure 1:
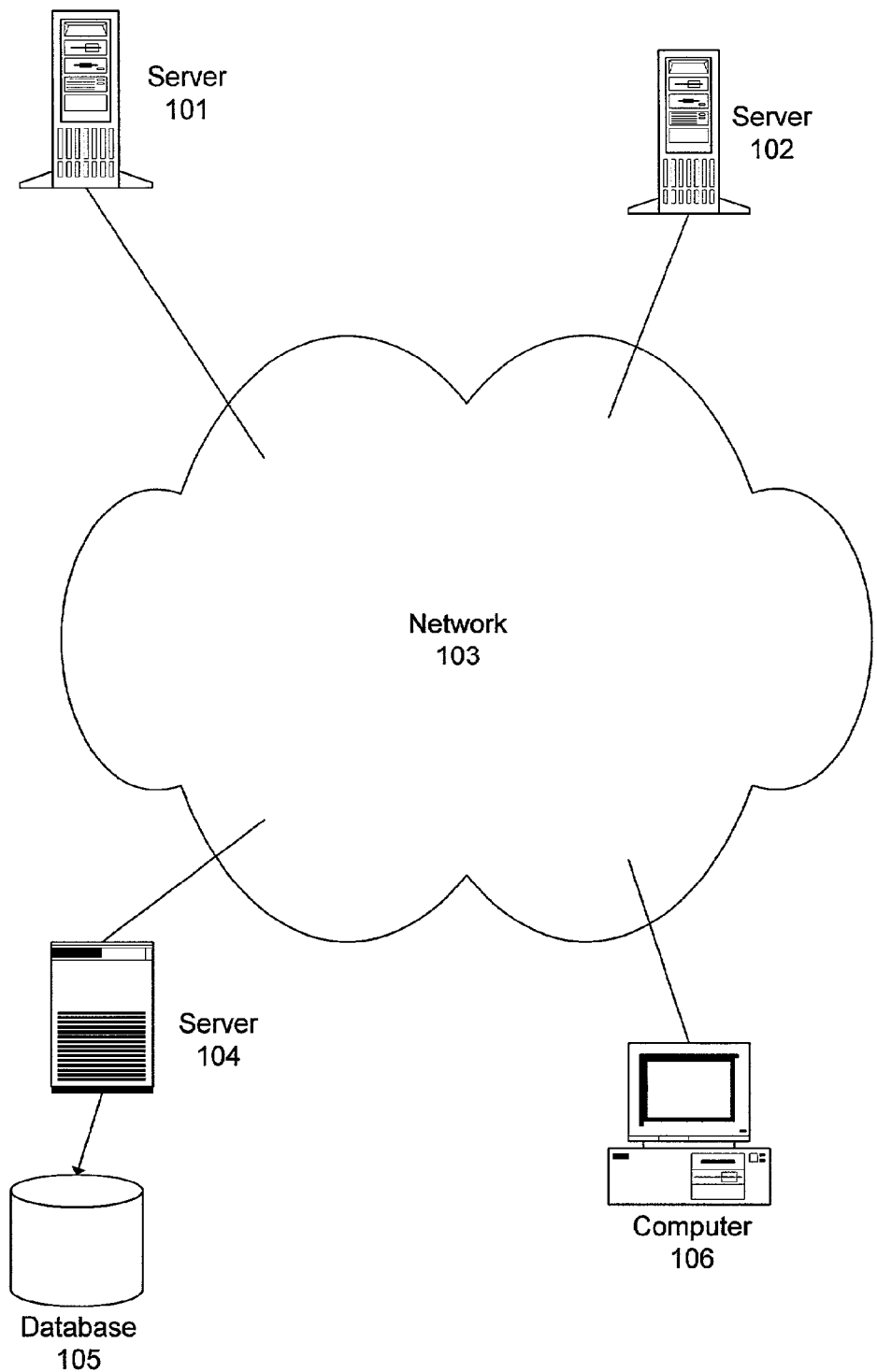
FIG. 1 illustrates one possible network architecture in which the system and method of the present invention could be implemented.

An example of a network that could be used with the present invention is shown in FIG. 1. Network 103 is any conventional network for data transmission including, for example, Ethernet, token ring, or RF hardware using the TCP/IP, IPv6, HTTP, or WAP protocols. Servers 101, 102, and 104 are any conventional hardware and software platforms used for implementing network file or web servers. These platforms may include, for example, Intel or AMD x86 processor based servers from Dell, Micron, or Compaq, Motorola processor based servers from Apple, workstations from Sun, IBM, or SGI, and mainframes or minicomputers such as the IBM S/390 or AS/400. The software running on these servers may include, for example, Microsoft Windows NT, MacOS, Red Hat Linux, FreeB SD, OS/400, a commercial Unix variant such as AIX or Solaris, or any other network capable operating system. These servers are also running a web or file server such as Microsoft Internet Information Server, Netscape FastTrack Server, or the Apache HTTP Server. Additionally, server 104 is equipped with a database 105 that is implemented with database management software such as, for example, Microsoft SQL Server, ORACLE, DB2, or a similar database product. Computer 106 is any general purpose home or office computer running an operating system such as Microsoft Windows 98 or NT, MacOS, or Linux and using a network application such as Netscape Navigator or Microsoft Internet Explorer.

According to one embodiment of the present invention, in order to ensure or verify that a content provider has agreed to the licensing terms for the use of the plug-in software, the present invention employs a public key encryption scheme. A content provider that wishes to play content on the plug-in software must first obtain an encrypted key from the software developer. As shown in FIG. 4, the content provider informs the software developer of the network address information of the server from which the content data object(s) will be downloaded and agrees to the software provider's license terms which may include an agreement to pay a licensing fee based on the number of times the content is played by the plug-in software (Step 400). The software developer then encrypts the network address information using the private key of a public/private key pair and gives the encrypted address information to the content provider (Step 410). The content provider then incorporates the encrypted address information directly into each data object or incorporates the encrypted address information into a particular location, such as a Hyper Text Markup Language (HTML) file (i.e., a webpage), on the server that will be providing the data objects for download (Step 420).

When the plug-in software downloads the data object in order to play it, the plug-in software also downloads the encrypted address information or extracts it from the data object. When the user "plays" the data object, the plug-in software decrypts the encrypted address information using the public key that corresponds to the private key with which the address information was encrypted. The decrypted address information can then be compared to the address information for the server from which the content was downloaded and if the information matches then the content is played. If the address information does not match then the plug-in software does not play (or does not continue to play) the content. This validation scheme will be further detailed and expanded upon in the information that follows.

Alternatively, the software developer could employ a licensing verification scheme using a verification server which is contacted by the plug-in software each time a data object is played. Under this arrangement, a content provider that wishes to play content on the plug-in software must first register the network address of the server where the data object is to be provided for download. To register the network address, the content provider informs the software developer of the network address of the server. After the content provider has agreed to abide by the licensing terms for the use of the plug-in software, the software developer stores the network address information in a database. When a user downloads a data object from the content provider's server, and begins to "play" to data object, the plug-in software sends a message containing the network address of the content provider's server to a license server maintained by the software developer. If the network address has not been registered with the software developer or the license has been revoked for failure to comply with its terms, the software developer sends a denial message back to the plug-in software. If the plug-in software receives a denial message, it refuses to continue playing the contents of the data object. However, the plug-in software continues playing the data object if no reply message is received. This validation scheme will be further detailed and expanded upon in the information that follows.

The license agreement and key issuance process or network address registration can also be completely automated through the use of a "click license" and scripting on the software developer's web site. After the content provider has agreed to the license and provided the necessary network address information, the encrypted network address information could be displayed on a dynamically created HTML page or emailed to the content provider.

According to one possible implementation of the present invention, a user at computer 106 downloads and installs plug-in software that was developed by a software developer employing the present invention. The user at computer 106 then accesses, via the network 103, a server 101 that contains content created by a content provider. A content data object is downloaded to computer 106 and the plug-in software begins to play the content contained within the data object. As the content begins to play, the plug-in software logs information about the content including the network address from which the content was downloaded or with which the content is associated. A record is logged for each time the content in any data object is played. Periodically, each electronic information appliance that uses the plug-in software sends this logged information via network 103 to a server 104 that stores this logging information in a database 105. The information in database 105 is processed to calculate how many times the content associated with a particular network address has been played. A total for each content provider is calculated by summing the values for each network address that is associated with that content provider and the software developer can then bill the content provider for the license fees.

The content in the data object could be any kind of content that it is desirable to view, listen, or interact with on a computer. This may include audio, video, animation, three dimensional content, interactive content such as games, or any combination thereof.

The public key encryption scheme employed in some embodiments of the present invention to verify that the content provider has agreed to the license and control whether data objects are played by the plug-in may be implemented similarly to digital signature schemes. Many well-known public key encryption algorithms are acceptable for use in this scheme including RSA, DSA, and ElGamal. A symmetric encryption scheme could also be used, however this may be less desirable because the key might be extracted by reverse engineering the client plug-in software. Other encryption schemes are, of course, possible.

Figure 2:
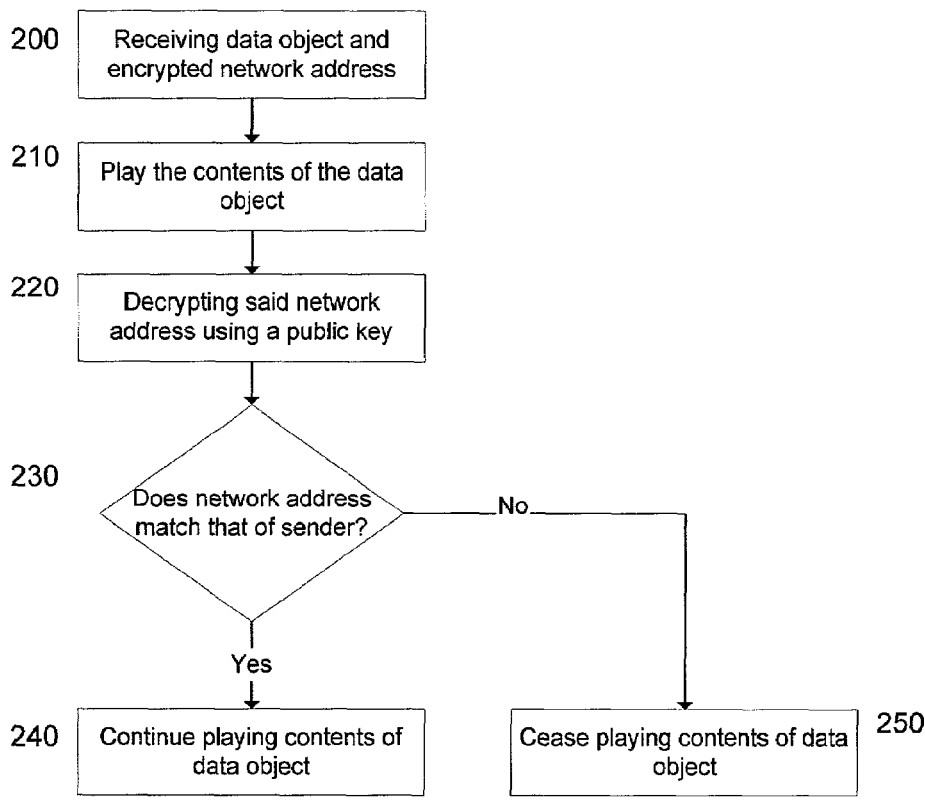
FIG. 2 illustrates one possible embodiment of the method of the present invention to prevent unlicensed use of the software using encryption.

FIG. 2 illustrates one method that could be employed by plug-in software to implement the encryption verification scheme of the present invention. The plug-in software on computer 106 receives the content data object and encrypted address information from server 101 (Step 200). The plug-in then begins playing the content contained in the data object so that the user does not experience any delay (Step 210). As the content begins playing, the plug-in decrypts the address information (Step 220) and compares it to the network address of server 101 (Step 230). If the address information matches then the plug-in simply continues to play the content (Step 240), but if the address information does not match, the plug-in ceases playing the content (Step 250).

Figure 3:
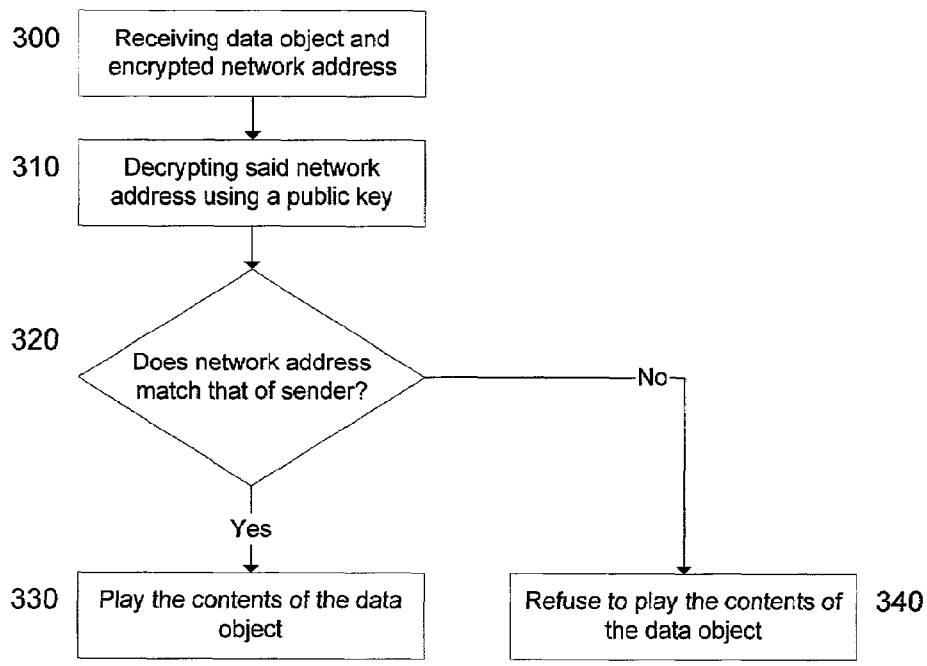
FIG. 3 illustrates an alternative embodiment of the method of the present invention to prevent unlicensed use of the software using encryption.

FIG. 3 illustrates another possible method of implementing the encryption based verification scheme of the present invention. The plug-in software on computer 106 receives the content data object and encrypted network address information from server 101 (Step 300). Before playing the content, the plug-in decrypts the network address information (Step 310), and compares it to the network address of server 101 (Step 320). If the address information matches, then the plug-in software plays the content contained in the data object (Step 330), but if the address information does not match, then the plug-in software does not play the content (Step 340).

FIG. 5 illustrates one possible method of implementing the message based verification scheme of the present invention. The plug-in software on computer 106 receives the content data object from server 101 (Step 500). The plug-in software begins playing the content contained in the data object (Step 510). As the content is playing, the plug-in software sends a message containing the network address information for server 101 to server 104 which is acting as the verification server (step 520). Server 104 checks the network address information against database 105 to verify that server 101 holds a valid license for the plug-in software. Server 104 sends a message back to the plug-in software on computer 106 indicating whether or not server 101 is licensed or, alternatively, server 104 may send a message only if server 101 is not licensed. If the plug-in software does not receive a response from server 104, the plug-in continues to play the content (Steps 530, 540). Continuing to play the content even if no response is received ensures that even if server 104 is down or unreachable, the user of the plug-in software will still be able to enjoy the content. If a response is received, the plug-in software examines the response to see if server 101 is properly licensed (Step 550). If the response is positive, the plug-in continues to play the software (Step 540). If the response is negative, the plug-in ceases playing the content and may display a message to the user indicating why the playing of the content was halted (Step 560).

Alternatively, rather than ceasing or refusing to play the content, the invention can be implemented so that if the content is unlicensed, the plug-in software will still play it but in a diminished capacity. For example, this reduction may be in the form of lower quality video by reducing the resolution or framerate, lower quality audio by reducing the sampling rate, diminished functionality by making some features unavailable, such as full screen display or the ability to manipulate a 3-D object, or by superimposing a watermark on the display that shows the software developer's logo, or shows text indicating that the license is invalid, the plug-in is running in demo mode, or a similar message.

The network address information that is used for verification can be almost any kind of network address including a Uniform Resource Locator (URL), a domain name, or an Internet Protocol (IP) address. The network address information may include a directory path name that would allow only data objects that are downloaded from that particular directory on the content provider's server to be played. This allows the present invention to be used effectively for content providers that may share a web server with other web sites. For example, three web sites may be hosted on the same server and thus all share the same network address. If only the domain name or IP address of the server was used for licensing, the plug-in software would not be able to distinguish between the three websites when verifying the license information or when calculating the billing information. Furthermore, if only one of the websites was licensed, the other websites could distribute content even though they had not agreed to a license. Including a specific directory in the network address information can eliminate these shortcomings by limiting a license to data objects that are downloaded from a certain directory on the content provider's server. When the plug-in software performs the license verification it checks to make sure that the network address of the server from which the content was downloaded and the directory on that server both match the license information that the content provider furnished when the license was granted.

Additional information about the license to which the content provider has agreed could also be encrypted with the network address information. For example, the software developer could include an expiration date encrypted with the address information. The plug-in software may then verify that the license has not expired in addition to validating the network address information before allowing the content to be played without restrictions.

Figure 6:
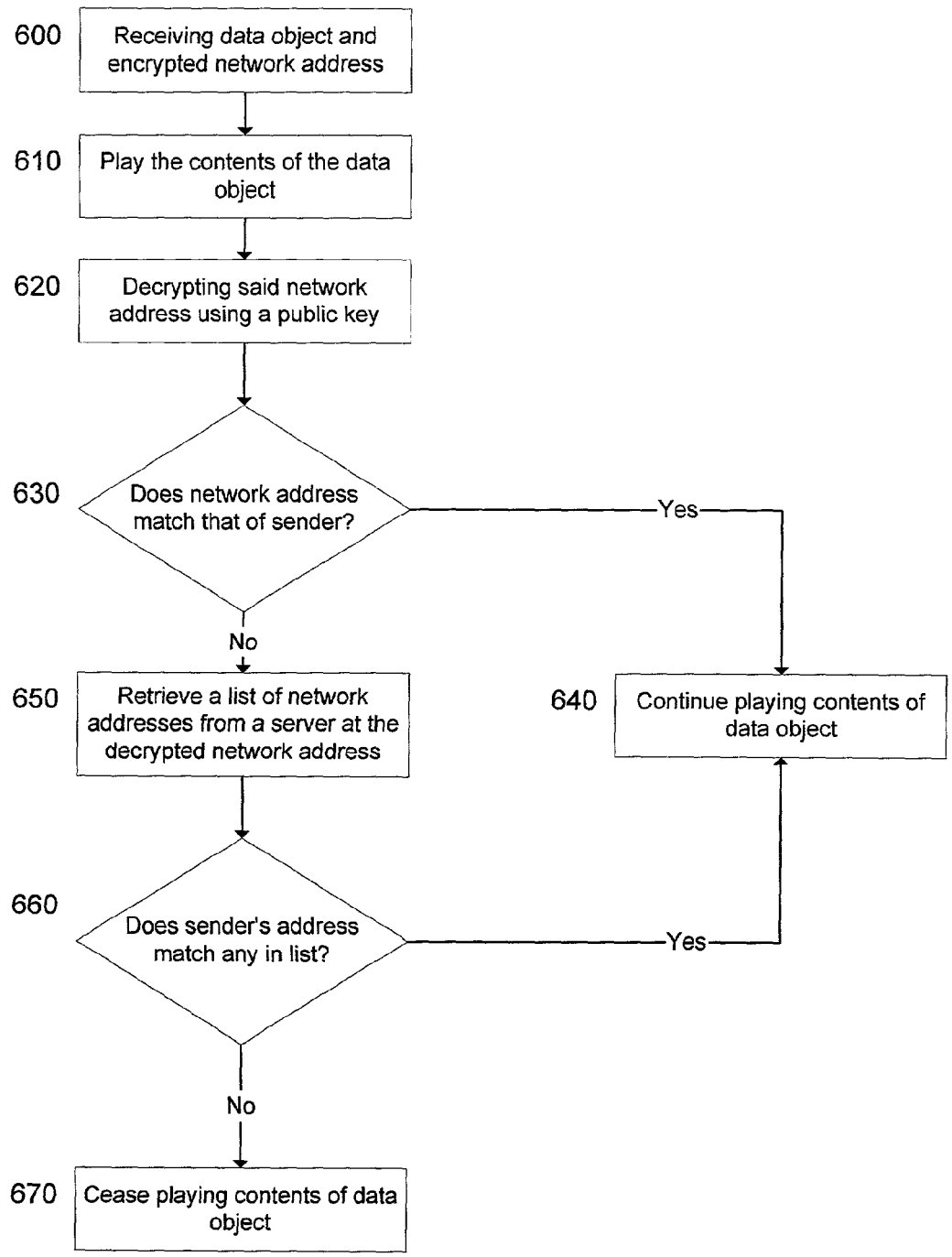
FIG. 6 illustrates one possible embodiment of the method of the present invention that allows for "umbrella" software licensing.

According to an example embodiment of the present invention, an "umbrella" licensing feature may be added which enables a content provider to allow other servers, "affiliated servers", to distribute content without obtaining a separate license for each affiliated server. One possible implementation of this feature is shown in FIG. 6. The plug-in software on computer 106 downloads the content data object and encrypted address information from server 101 (Step 600), and begins playing the content (Step 610). The plug-in software then decrypts the address information (Step 620) and compares it to the network address of server 101 (Step 630). If the address information matches then the plug-in continues playing the content (Step 640). If the network address information does not match then the plug-in software accesses the server to which the decrypted network information corresponds (one that is usually controlled by the umbrella license holder), server 102 in this example, and requests a list of network addresses (Step 650). This list of network addresses can be stored as a text file, an HTML webpage, or a customized file-type at a predetermined location on server 102. This file may then downloaded by the plug-in software using a standard HTML request or another appropriate network protocol. The plug-in software searches this list for the network address of server 101 (Step 660). If the address is in the list, then the plug-in continues playing the content (Step 640). If the address is not in the list then the plug-in ceases playing the content (Step 670). This umbrella licensing feature has a number of advantages. For example, a manufacturer of a brand name product may prepare content data objects that showcase the best features of their product by, for example, allowing users to view three dimensional models of the products. This manufacturer may distribute their product through a network of authorized retail dealers, each of whom pay some premium to be authorized dealers, but some unauthorized dealers may also be reselling the manufacturers product as well. Under this umbrella licensing scheme, the manufacturer could purchase an umbrella license and include the websites each of the authorized dealers on the list of affiliated servers. The authorized dealers would then also have the benefit of the content data objects for use on their websites, but the unauthorized dealers would not be able to use the content data objects because the plug-in software would not play data objects that had been downloaded from servers that were not on the affiliated server list. The umbrella licensing feature also has the advantage of allowing the license holder to have complete control over the list of affiliated servers. Since the list is stored on the content provider's own server, the content provider can add or remove network addresses from the list without assistance from the plug-in software developer. In this example, if one of the authorized dealers is no longer authorized, the manufacturer could immediately remove that dealer's website from the affiliated server list.

Figure 7:
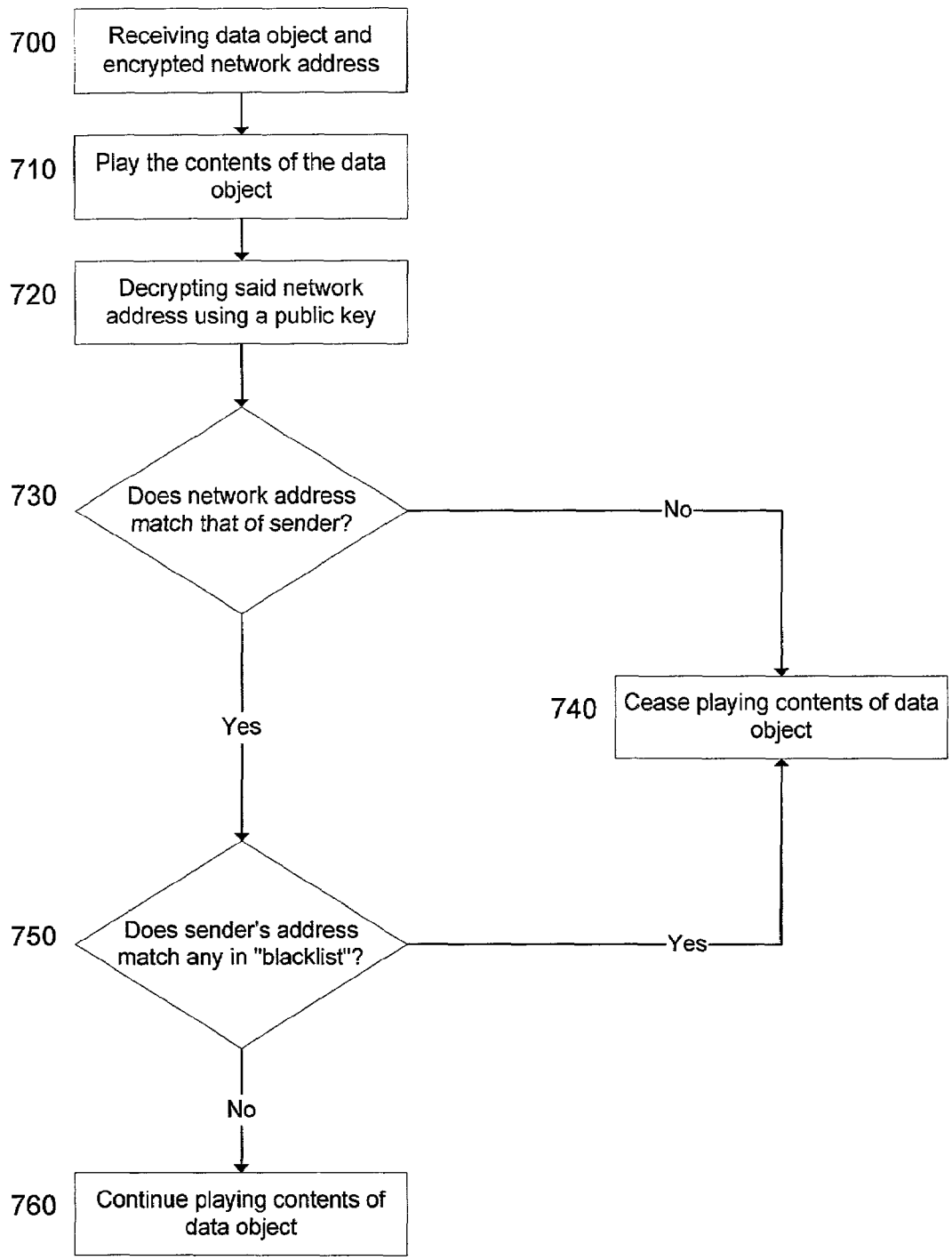
FIG. 7 illustrates one possible embodiment of the method of the present invention that includes a "blacklisting" feature.

According to the present invention, a "blacklisting" feature allows the plug-in software developer to prevent the plug-in from playing the content of content providers who, for example, are delinquent on their license fee payments. In one embodiment, the plug-in software is configured to periodically download a list of network addresses that belong to delinquent content providers. When data objects from those network addresses are downloaded, the plug-in will not play them. One possible implementation of this "blacklisting" feature is illustrated in FIG. 7. The plug-in software on computer 106 downloads a data object and encrypted address information from server 101 (Step 700), and begins playing the content (Step 710). While the content is playing, the plug-in software decrypts the network address information (Step 720) and compares it to the network address of server 101 (Step 730). If the address information does not match, the plug-in stops playing the content (Step 740). If the address information does match, then the plug-in searches for the network address in the "blacklist" that it has downloaded from the software developer (Step 750). If the network address is found in the blacklist then the plug-in stops playing the content (Step 740). If the network address is not found in the blacklist then the plug-in continues playing the content (Step 760). The blacklist may be downloaded from the software developer's server 104 at some periodic interval established by the plug-in software. The software developer's server can automatically prepare this list from the information stored in the licensing database.

Figure 8:
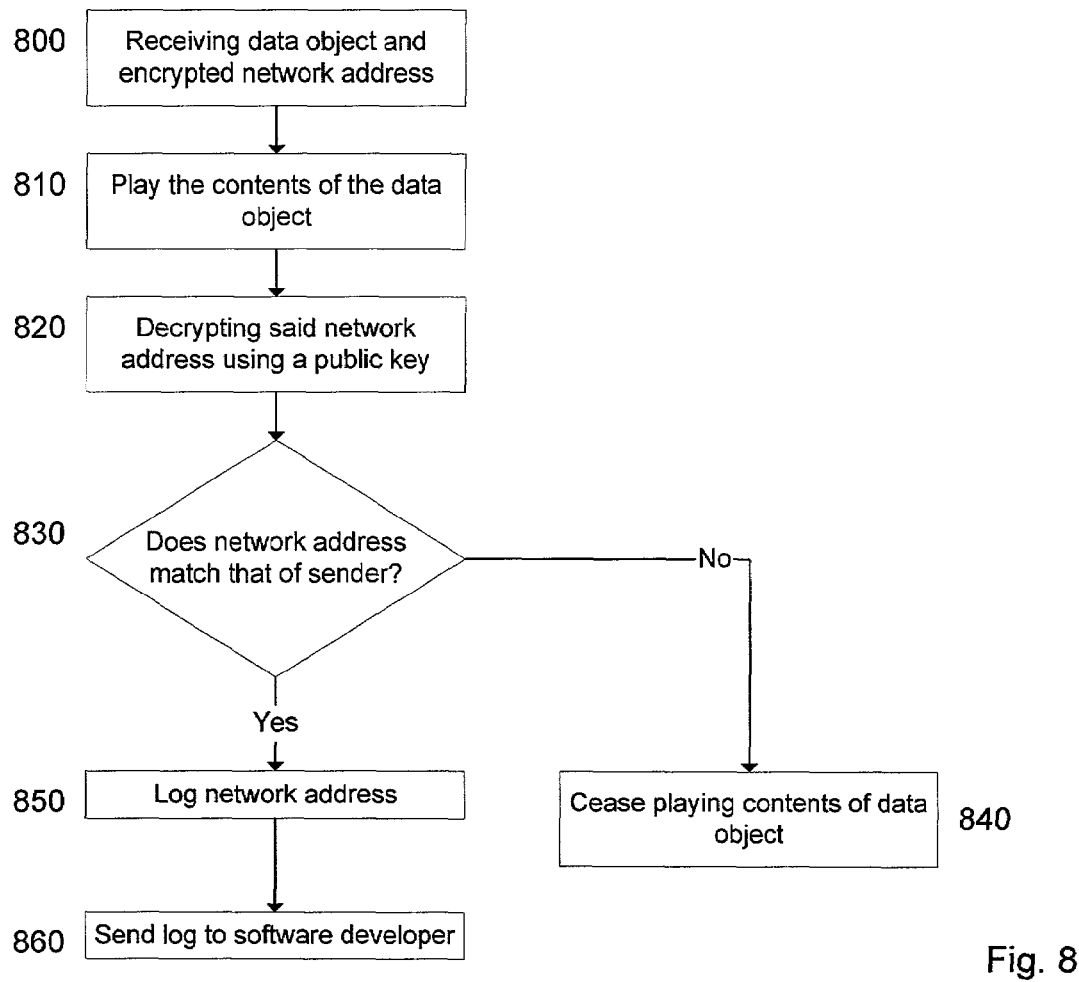
FIG. 8 illustrates one possible embodiment of the method of the present invention that includes logging the use of the software.

FIG. 8 illustrates one possible implementation of the logging feature of the present invention that allows the software developer to bill content providers based on the number of times that their content has been played and collect information about what content has been played by the user. The plug-in software on computer 106 downloads a content data object and encrypted address information from server 101 (Step 800) and begins to play the content (Step 810). While the content is playing, the plug-in software decrypts the network address information (Step 820) and compares it to the network address of server 101 (Step 830). If the address information does not match then the plug-in stops playing the content (Step 840). If the address information does match, then the plug-in software creates a logging entry that includes the network address information as well as other information about the user and the data object (Step 850). Periodically, the plug-in software will send this logging information to server 104 for storage in database 105 (Step 860). The frequency that this information is sent to the software developer can be determined by one or more methods including methods based on date, time, number of "plays", etc. For example, the plug-in software could be configured to send the logging information to server 104 once a week, or every 30 "plays", whichever occurs first.

Figure 9:
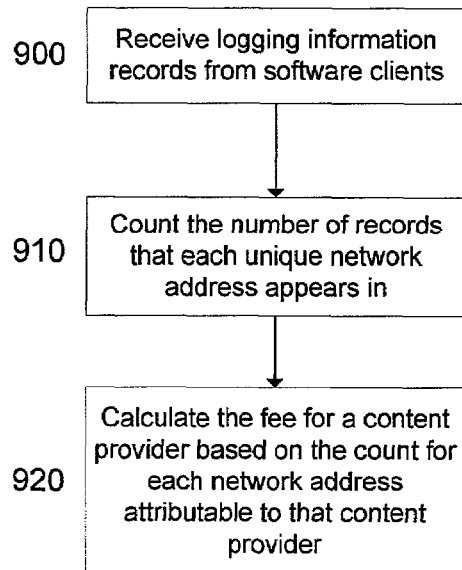
FIG. 9 illustrates one possible embodiment of the method of the present invention to calculate the license fees owed by content providers.

FIG. 9 illustrates one possible implementation of the billing process of the present invention. Server 104 receives the logging information from all of the plug-in software and stores it in database 105 (Step 910). The number of times that each unique network address appears in the records is then counted (Step 920). The network addresses are then matched to a corresponding content provider and a fee is calculated for each content provider based on the total number of "plays" of that provider's content (Step 930). This fee can be calculated in any number of ways. One possible method is only charging content providers that have exceeded a large number of "plays", such as 10,000 per month. This encourages the adoption of the software by a large number of small sites and then only when the sites reach a certain level of use or popularity will they be billed. Additionally, the larger number of sites that use the plug-in, the more incentive there is for tool vendors to support the format specifications for the content data objects.

The logging information that is sent to the software developer could also include other information about the user of the plug-in including demographic information, which web sites the user frequents, and what other data objects the user has played. The amount of information gathered also could be configured by the software developer to vary based on the content provider or based on characteristics of the user. This information could be provided as reports to content providers for an additional charge so that they can see a demographic profile of the users who are downloading their content. These reports could contain a variety of information organized according to the particular interests of the content provider. For example, a car manufacturer of may be interested in seeing what other car related websites are being visited by the viewers of its content. Furthermore, umbrella license holders could be provided with the demographic information of users who played the content that was downloaded from one of the umbrella license holder's affiliated servers. If demand for this service is great enough, the software developer may be able to forgo license fees entirely and merely bill content providers for these demographic reports.

The software plug-in can also be configured to check with server 104 or some other server maintained by the software developer for updates to the plug-in software and to download a current blacklist. This update check could occur whenever the plug-in software is run, when the logging information is sent to server 104, or any other time of the developer's choosing. The download of updates and upload of logging information can also be configured to occur only when the user's computer or network connection is idle so that the process does not affect the user's enjoyment of the system.

The present invention is not limited to the specific embodiments described. It is expected that those skilled in the art will be able to devise other implementations that embody the principles of the present invention and remain within its scope.

What is claimed is:

1. A method for controlling the use of a data object using encrypted network address information, comprising the steps of:
   receiving at an electronic information appliance, a data object and predetermined encrypted network address information from a server;
   playing content from said data object at the electronic information appliance;
   decrypting said predetermined encrypted network address information;
   determining whether said decrypted network address information corresponds to a network address information of said server; and
   based on said determining, ceasing to play content from said data object.

2. The method of claim 1 wherein said network address information is a Uniform Resource Locator.

3. The method of claim 1 wherein said network address information includes a domain name.

4. The method of claim 1 wherein said network address information includes a directory name.

5. The method of claim 1 wherein said network address information includes an Internet Protocol address.

6. The method of claim 1 wherein said decrypting step employs the public key of a public/private key pair to decrypt said encrypted network address information.

7. The method of claim 1 wherein said decrypting step employs a digital signature scheme to decrypt said encrypted network address information.

8. The method of claim 1 wherein said encrypted network address information is included in said data object.

9. The method of claim 1 wherein said encrypted network address information is included in a world wide web page residing on said server.

10. The method of claim 1 wherein the encrypted network address information also includes license information.

11. The method of claim 10 wherein the license information includes an expiration date.

12. The method of claim 1 further comprising the steps of:
    storing logging information about said data object; and
    periodically sending said logging information to a remote network location.

13. The method of claim 12 wherein said logging information includes the network address information.

14. The method of claim 12 wherein said logging information includes information about the individual who requested the data object.

15. A method for controlling the playing of content using encrypted network address information, comprising the steps of:
    receiving at an electronic information appliance, a data object and predetermined encrypted network address information from a first server;
    playing content from said data object at the electronic information appliance;
    decrypting said predetermined encrypted network address information;
    receiving a plurality of network addresses from a second server corresponding to said decrypted network address information;
    searching said plurality of network addresses for a network address of said first server; and
    based on said searching, ceasing to play content from said data object.

16. The method of claim 15 further comprising the steps of:
    storing logging information about said data object; and
    periodically sending said logging information to a third server.

17. The method of claim 16 wherein said logging information includes the network address information.

18. The method of claim 16 wherein said logging information includes information about the individual who requested the data object.

19. The method of claim 15 wherein said network address information is a Uniform Resource Locator.

20. The method of claim 15 wherein said network address information includes an Internet Protocol address.

21. The method of claim 15 wherein said decrypting step employs the public key of a public/private key pair to decrypt said encrypted network address information.

22. The method of claim 15 wherein said decrypting step employs a digital signature scheme to decrypt said encrypted network address information.

23. The method of claim 15 wherein said encrypted network address information is included in said data object.

24. The method of claim 15 wherein said encrypted network address information is included in a world wide web page residing on said server.

25. The method of claim 15 wherein the encrypted network address information also includes license information.

26. The method of claim 25 wherein the license information includes an expiration date.

27. A method for controlling the playing of content using encrypted network address information, comprising the steps of:

receiving at an electronic information appliance, a data object and predetermined encrypted network address information from a server;

playing content from said data object at the electronic information appliance;

decrypting said predetermined encrypted network address information;

searching a plurality of network addresses for a network address corresponding to said decrypted network address information; and based on said searching, ceasing to play the contents of said data object.

28. The method of claim 27 wherein said network address information is a Uniform Resource Locator.

29. The method of claim 27 wherein said network address information includes an Internet Protocol address.

30. The method of claim 27 wherein said decrypting step employs the public key of a public/private key pair to decrypt said encrypted network address information.

31. The method of claim 27 wherein said decrypting step employs a digital signature scheme to decrypt said encrypted network address information.

32. The method of claim 27 wherein said encrypted network address information is included in said data object.

33. The method of claim 27 wherein said encrypted network address information is included in a world wide web page residing on said server.

34. A method for calculating license fees for client software based on the network address of the content provider, comprising the steps of:

receiving a plurality of records from a plurality of software clients wherein each record includes a network address;

determining the number of records of said plurality of records that include a particular network address; and calculating a license fee for said particular network address based on said number of records.

35. The method of claim 34 further comprising the step of:

selecting said particular network address from the plurality of network addresses included in said plurality of records.

36. The method of claim 35 further comprising the step of:

repeating said determining and said calculating steps until a license fee has been calculated for each unique network address that is included in said plurality of records.

37. The method of claim 36 wherein if said number of records that include said particular network address is less than a predesignated value, then the license fee is set to zero.

38. The method of claim 35 wherein if said number of records that include said particular network address is less than a predesignated value, then the license fee is set to zero.

39. A system for calculating software licensing fees, comprising:

a plurality of software clients;

a plurality of content servers; and a billing server, wherein each of said plurality of software clients downloads and plays content from said plurality of content servers, logs information about the content played, and sends said logged information to said billing server; and said billing server uses the logged information received from said plurality of software clients to calculate the number of times that content from each content server was played and uses said number of times to calculate a license fee to be charged to the entity that operates the content server.

40. The system of claim 39 wherein said logged information includes a network address for the content server from which the content was downloaded.

41. The system of claim 39 wherein said logged information includes information about the user of the client software.

42. The system of claim 39 wherein said client software verifies that the content server from which the content has been downloaded has agreed to a set of licensing terms.

43. The system of claim 42 wherein a public key encryption scheme is used by said client software to perform the verification.

44. A method for controlling the playing of content using encrypted network address information, comprising the steps of:

receiving at an electronic information appliance, a data object and predetermined encrypted network address information from a server;

decrypting said predetermined encrypted network address information;

determining whether said decrypted network address information corresponds to a network address information of said server; and based on said determining, playing content from said data object at the electronic information appliance.

45. The method of claim 44 further comprising the step of:

if said correspondence does not exist, playing contents from said data object in a diminished capacity.

46. The method of claim 44 further comprising the step of:

if said correspondence does not exist, playing contents from said data object with diminished quality.

47. The method of claim 44 further comprising the step of:

if said correspondence does not exist, playing contents from said data object with diminished functionality.

48. The method of claim 44 further comprising the steps of:

storing logging information about said data object; and periodically sending said logging information to a second server.

49. The method of claim 48 wherein said logging information includes the network address information.

50. The method of claim 48 wherein said logging information includes information about the individual who requested the data object.

51. The method of claim 45 further comprising the steps of:

storing logging information about said data object; and periodically sending said logging information to a second server.

52. The method of claim 51 wherein said logging information includes the network address information.

53. The method of claim 51 wherein said logging information includes information about the individual who requested the data object.

54. The method of claim 45 wherein said network address information is a Uniform Resource Locator.

55. The method of claim 45 wherein said network address information includes an Internet Protocol address.

56. The method of claim 45 wherein said decrypting step employs the public key of a public/private key pair to decrypt said encrypted network address information.

57. The method of claim 45 wherein said decrypting step employs a digital signature scheme to decrypt said encrypted network address information.

58. The method of claim 45 wherein said encrypted network address information is included in said data object.

59. The method of claim 45 wherein said encrypted network address information is included in a world wide web page residing on said server.

60. An article of manufacture comprising a computer-readable medium having stored thereon instructions adapted to be executed by a processor, the instructions which, when executed, define a series of steps to be used to control the playing of the contents of a data object, said steps comprising:
- receiving at an electronic information appliance, a data object and predetermined encrypted network address information from a server;
- decrypting said predetermined encrypted network address information;
- determining whether said decrypted network address information corresponds to a network address information of said server; and
- based on said determining, playing contents from said data object at the electronic information appliance.

61. The article of manufacture of claim 60 further comprising the step of:
- if said correspondence does not exist, playing contents from said data object with diminished quality.

62. The article of manufacture of claim 60 further comprising the step of:
- if said correspondence does not exist, playing contents from said data object with diminished functionality.

63. The article of manufacture of claim 60 wherein said series of steps further comprise the steps of:
- storing logging information about said data object; and
- periodically sending said logging information to a second server.

64. The article of manufacture of claim 63 wherein said logging information includes the network address information.

65. The article of manufacture of claim 63 wherein said logging information includes information about the user of the article of manufacture.

66. The article of manufacture of claim 60 wherein said network address information is a Uniform Resource Locator.

67. The article of manufacture of claim 60 wherein said network address information includes an Internet Protocol address.

68. The article of manufacture of claim 60 wherein said decrypting step employs the public key of a public/private key pair to decrypt said encrypted network address information.

69. The article of manufacture of claim 60 wherein said decrypting step employs a digital signature scheme to decrypt said encrypted network address information.

70. The article of manufacture of claim 60 wherein said encrypted network address information is included in said data object.

71. The article of manufacture of claim 60 wherein said encrypted network address information is included in a world wide web page residing on said server.

72. The article of manufacture of claim 60 wherein the encrypted network address information also includes license information.

73. The article of manufacture of claim 72 wherein the license information includes an expiration date.

74. An article of manufacture comprising a computer-readable medium having stored thereon instructions adapted to be executed by a processor, the instructions which, when executed, define a series of steps to be used to control the playing of the contents of a data object, said steps comprising:
- receiving at an electronic information appliance, a data object and predetermined encrypted network address information from a server;
- playing contents from said data object;
- decrypting said predetermined encrypted network address information;
- searching a plurality of network addresses for a network address corresponding to said decrypted network address information; and
- based on said searching, ceasing to play the contents of said data object.

75. The article of manufacture of claim 74 wherein said network address information is a Uniform Resource Locator.

76. The article of manufacture of claim 74 wherein said network address information includes an Internet Protocol address.

77. The article of manufacture of claim 74 wherein said decrypting step employs the public key of a public/private key pair to decrypt said encrypted network address information.

78. The article of manufacture of claim 74 wherein said decrypting step employs a digital signature scheme to decrypt said encrypted network address information.

79. The article of manufacture of claim 74 wherein said encrypted network address information is included in said data object.

80. The article of manufacture of claim 74 wherein said encrypted network address information is included in a world wide web page residing on said server.

81. An article of manufacture comprising a computer-readable medium having stored thereon instructions adapted to be executed by a processor, the instructions which, when executed, define a series of steps to be used to control the playing of the contents of a data object, said steps comprising:
- receiving at an electronic information appliance, a data object and predetermined encrypted network address information from a first server;
- playing contents from said data object;
- decrypting said predetermined encrypted network address information;
- receiving a plurality of network addresses from a second server corresponding to said decrypted network address information;
- searching said plurality of network addresses for a network address of said first server; and
- based on said searching, ceasing to play the contents of said data object.

82. The article of manufacture of claim 81 wherein said network address information is a Uniform Resource Locator.

83. The article of manufacture of claim 81 wherein said network address information includes an Internet Protocol address.

84. The article of manufacture of claim 81 wherein said decrypting step employs the public key of a public/private key pair to decrypt said encrypted network address information.

85. The article of manufacture of claim 81 wherein said decrypting step employs a digital signature scheme to decrypt said encrypted network address information.

86. The article of manufacture of claim 81 wherein said encrypted network address information is included in said data object.

87. The article of manufacture of claim 81 wherein said encrypted network address information is included in a world wide web page residing on said server.

88. An article of manufacture comprising a computer-readable medium having stored thereon instructions adapted to be executed by a processor, the instructions which, when executed, define a series of steps to be used to calculate license fees for client software based on the network address of the content provider, said steps comprising:
- receiving a plurality of records from a plurality of software clients wherein each record includes a network address;
- determining the number of records of said plurality of records that include a particular network address; and calculating a license fee for said particular network address based on said number of records.

89. The article of manufacture of claim 88, wherein said series of steps further comprise the steps of:
selecting said particular network address from the plurality of network addresses included in said plurality of records; and
repeating said determining and said calculating steps until a license fee has been calculated for each unique network address that is included in said plurality of records.

90. A method for controlling the use of a data object using network address information, comprising the steps of:
receiving at an electronic information appliance, a data object and network address information from a server;
playing contents from said data object;
sending a message to a verification server containing said network address information;
receiving a response from said verification server; and
based on said response, ceasing to play contents from said data object.

91. The method of claim 90 wherein said network address information is a Uniform Resource Locator.

92. The method of claim 90 wherein said network address information includes a domain name.

93. The method of claim 90 wherein said network address information includes a directory name.

94. The method of claim 90 wherein said network address information includes an Internet Protocol address.

95. The method of claim 90 further comprising the steps of:
storing logging information about said data object; and
periodically sending said logging information to a remote network location.

96. The method of claim 95 wherein said logging information includes the network address information.

97. The method of claim 95 wherein said logging information includes information about the individual who requested the data object.

* * * * *